J. B. CONRAD.
WATERING TROUGH.
APPLICATION FILED MAY 24, 1915.
1,172,584.
Patented Feb. 22, 1916.
2 SHEETS—SHEET 2.
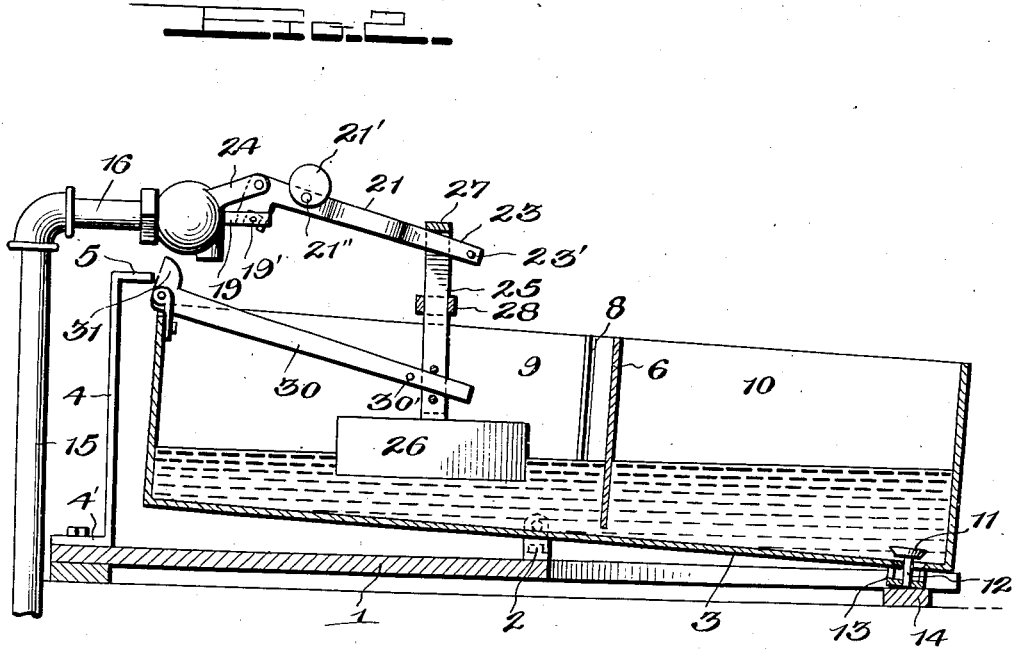
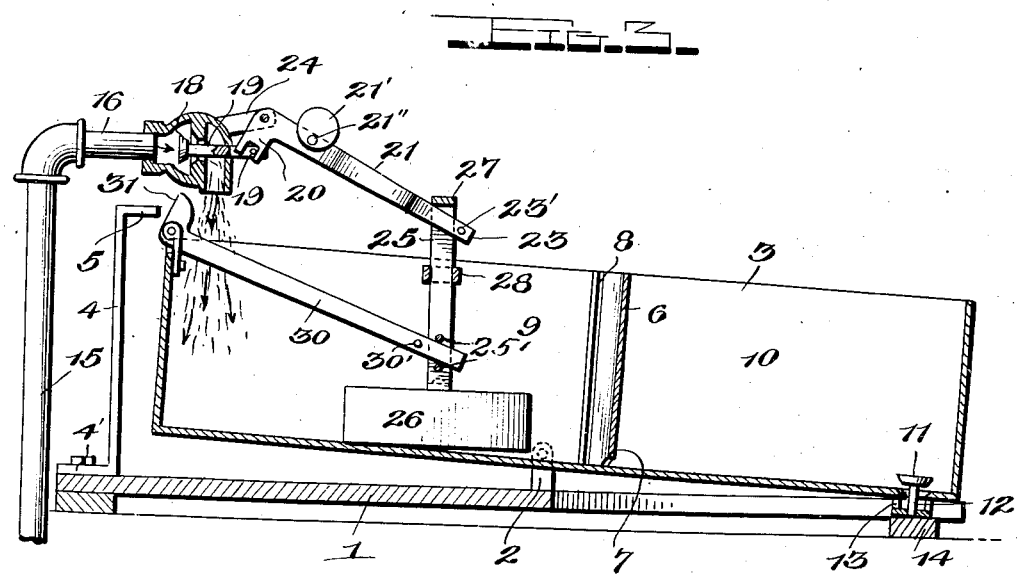
Witnesses
Inventor
John B. Conrad,
By H. B. Willson & Co.
Attorneys

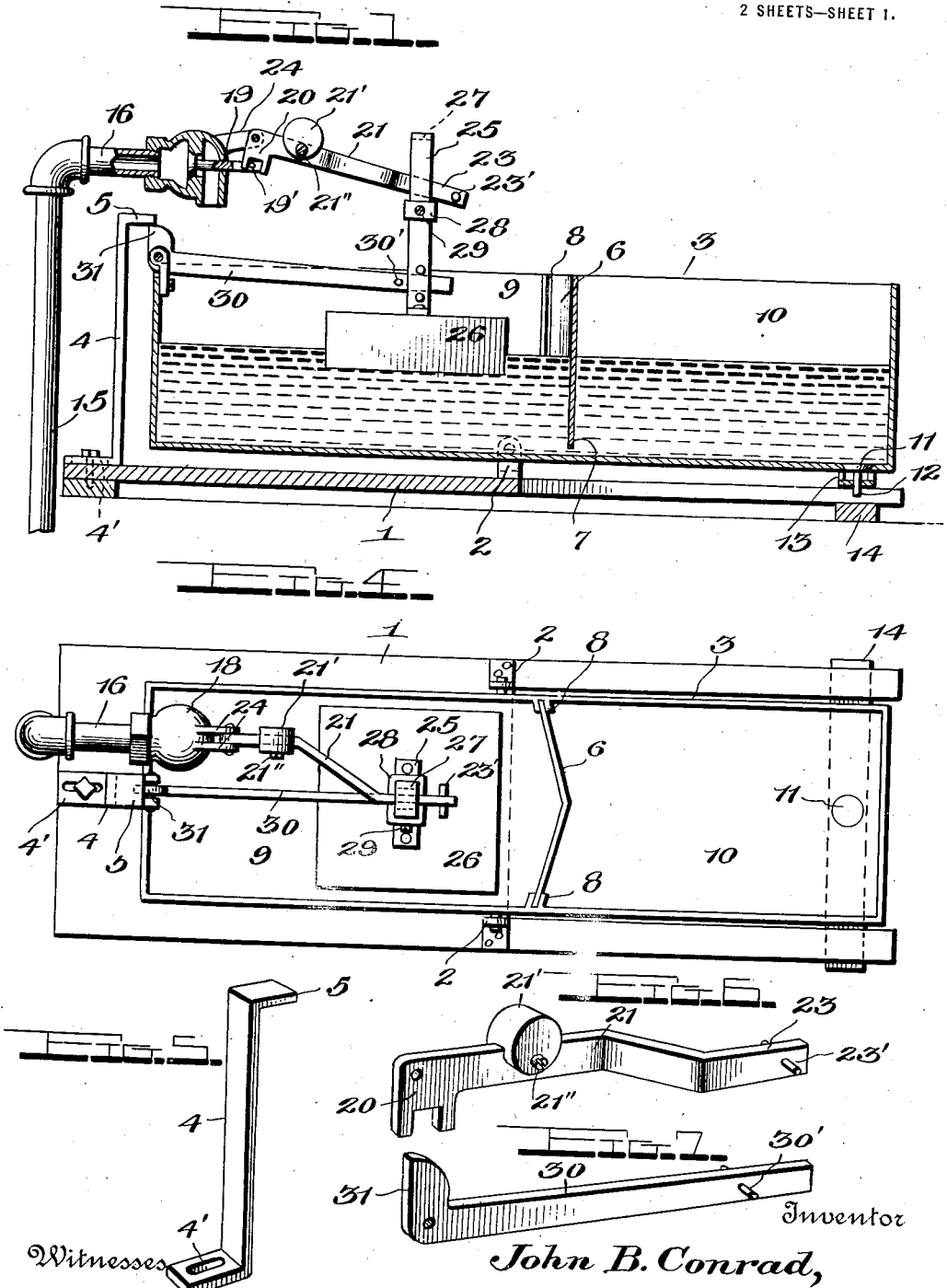

UNITED STATES PATENT OFFICE.

JOHN B. CONRAD, OF NICOLAUS, CALIFORNIA.

WATERING-TROUGH.

1,172,584.  Specification of Letters Patent.  Patented Feb. 22, 1916.

Application filed May 24, 1915. Serial No. 30,091.

*To all whom it may concern:*

Be it known that I, JOHN B. CONRAD, a citizen of the United States, residing at Nicolaus, in the county of Sutter and State of California, have invented certain new and useful Improvements in Watering-Troughs; and I do declare the following to be a full, clear, and exact description of the invention, such as will enable others skilled in the art to which it appertains to make and use the same.

This invention relates to improvements in drinking fountains and more particularly to watering troughs for poultry and stock.

The object of the invention is to provide a trough of this character which is simple in construction and by means of which water from one compartment can be fed into another to maintain the water level at a predetermined height within the trough and which provides for the discharge of the water from the trough and the cleansing thereof.

With this and other objects in view, the invention consists of certain novel features of construction and the combination and arrangement of parts as will be hereinafter more fully described and claimed.

In the accompanying drawings: Figure 1 represents a longitudinal section of a watering trough constructed in accordance with this invention showing it in filled operative position; Fig. 2 is a similar view showing the trough tilted in the position it assumes when discharging; Fig. 3 is a similar view showing the parts in the position assumed during filling; Fig. 4 is a plan view thereof; Fig. 5 is a detail perspective view of the locking standard; Fig. 6 is a similar view of one of the levers employed; Fig. 7 is a similar view of another lever.

In the embodiment illustrated a supporting base or platform 1 is shown having upwardly projecting apertured lugs 2 forming bearings which are shown arranged midway of the ends of said base and between which is fulcrumed the trough 3. This trough 3 is here shown in the form of a rectangular box pivotally mounted on the bearings 2 at a point intermediately of its ends at one side of the center thereof so that one end has a tendency to overbalance the other. This trough is so pivoted that when one compartment is partially filled with water it will overcome the weight of the other and cause the trough to right itself and be normally held against tilting by means of a standard 4 here shown adjustably secured at one end to the base 1 and having its upper free end provided with a laterally extending hook-like finger or latch 5 which is adapted to project over the upper edge of the trough at one end thereof for engagement with a catch to be described. (See Fig. 1). This standard 4 has a laterally extending longitudinally slotted foot 4' to adapt said standard to be moved toward or away from the trough to provide for the dumping of the trough when desired. This trough 3 has a transverse partition 6 arranged therein about midway its ends and this partition is provided at its lower end with an opening 7 to permit the water to flow thereunder from the inlet compartment 9 to the dispensing compartment 10. This partition 6 is herein shown slidably and removably mounted in guides 8 secured to the opposite side walls of the tank or trough 3 on the inner faces thereof and it divides the trough into the inlet compartment 9 and the outlet or drinking compartment 10. The drinking compartment 10 has a valved opening in the bottom thereof preferably near its outer end, the valve 11 which closes said opening, being here shown with a depending stem 12 extending through a guide 13 carried on the bottom of the trough. This stem projects some distance below the guide and is designed for contacting with a cross bar 14 when the tank is in a predetermined position hereinafter described whereby the valve is opened to permit the discharge of the water in the compartment 10 through the opening.

A water supply pipe 15 connected with any suitable source of supply extends upwardly at the outer end of the compartment 9 and has a lateral arm 16 projecting over said compartment and provided with a downturned spout 17 positioned to discharge water into the compartment 9 at predetermined intervals. A valve 18 is mounted to close the end of the pipe arm 16 and opens against the pressure of the water in said pipe so that said pressure will tend to seat it and hold it closed. This valve has a stem 19 extending longitudinally outward through the front end of the spout 17 where it is connected with a depending arm 20 of a bell crank lever 21, said lever being fulcrumed between a pair of laterally spaced apertured ears 24 carried by the spout 17 as is shown clearly in Figs. 1 and 4. The long arm of this lever 21 extends over the compartment 9, and the outer end 23 thereof is offset laterally and its terminal extends through a loop-shaped stem 25 of a float 26 and is held against accidental disengagement by a pin or split key 23'. This float stem 25 is here shown inverted U-shaped with its closed upper end forming a stop 27 and is provided at a point intermediately of its ends below the lever 21 with another stop 28 which is adjustably mounted on said stem, a set screw 29 being herein shown for holding it in adjusted position between the legs of the stem. This float 26 may be of any desired configuration being here shown rectangular.

The connection of the valve stem 19 with the short arm or finger 20 of the bell crank 21 is effected by means of a pin 19' extending transversely through the free end of the valve stem 19 which is bifurcated to receive and guide the free end of arm 20 which is also bifurcated in a plane at right-angles to the bifurcation of stem 19 to provide for the sliding connection of the lever 21 relatively to said stem 19 and hence provides for the upward and downward movement of said lever 21 without twisting or otherwise deflecting said stem 19 and also for the movement of said lever a predetermined distance without actuating the valve. A weight 21' is adjustably mounted on the lever 21 a set screw 21'' being here shown for this purpose. This weight 21' is designed to assist the float 26 connected with lever 21 to open valve 18 against different water pressures.

Another lever 30 is fulcrumed at one end near the upper edge of the outer end wall of the compartment 9 and extends horizontally over said compartment with its free end passed through the float stem 25 between the legs thereof and is secured against accidental detachment by a split pin 30'. This lever end is shown mounted between two vertically spaced pins 25' extending transversely through the legs of stem 25. The other end of this lever has an upturned right angularly disposed finger 31 which is designed as a catch for engagement by the laterally extending latch or finger 5 of the standard 4 as is shown clearly in Fig. 1 and by means of which the tank or trough 3 is held in horizontal position when the water therein is at the desired level.

From the foregoing description it will be understood that the float 26 controls the water inlet valve 18 and the tank or trough 3 may be filled to any desired point before the water is shut off according to the adjustment of the stop 28 on the float stem 25 relatively to the lever 21, which is accomplished by moving the stop 28 up or down on said stem 25, it being obvious that this stop on coming in contact with the lever 21 on the continued rising of the float will force said lever upwardly thereby moving its free arm or finger 20 outwardly carrying with it the valve stem 19 and thus seating the valve 18 and cutting off the water supply through pipe 16, the water pressure assisting in closing the valve and holding it closed until again forcibly opened. This rising of the float 26 carries with it the lever 30, and when said float and lever reach the position shown in Fig. 1 the catch 31 at the end of said lever will pass under and engage the finger 5 of standard 4 and thus lock the trough against downward tilting at its opposite end. The stop 28 engages the free end of lever 21 and forces it upward and thereby closes valve 18.

In the use of this improved watering trough when the parts are in the position shown in full lines in Fig. 1 the trough is ready for use and poultry, stock or other animals may drink from the compartment 10. The lowering of the water in compartment 10 which is produced by the drinking of the stock therefrom causes the float 26 to fall in proportion to the quantity of water removed. The sliding connection of the finger or arm 20 of the lever 21 with valve stem 19 also permits said lever 21 to drop a predetermined distance controlled by the space between the furcations of said arm 20 and the weight 21' before the valve 18 will be opened. When float 26 lowers on the lowering of the water in compartment 9 the long arm of the lever 30 being held by pins 30' is moved slowly downward and owing to its great length in comparison with its short arm or latch 31 thereof said latch is slowly disengaged from catch 5 so that when the float approaches the bottom of the compartment 9 the lever is entirely released from catch 5 and permits the end of the tank carrying the compartment 10 to tilt or lower and open valve 11 as above described for discharging the water from said tank. When the compartment 9 empties entirely the float will drop into contact with the bottom thereof as shown in Fig. 3. This final drop of the float causes the stop 27 to engage lever 21 and open valve 18 thereby admitting water to the tank. The water first flowing in sluices out the two compartments and thoroughly cleanses them. The inflow of the water into the compartment 9 being greater than the outflow therefrom through the opening 7 causes the compartment 9 to fill before the compartment 10 and thus the weight in said compartment 9 caused by the uneven height of the water will overcome the weight in compartment 10 and thereby cause the trough to right itself and swing up into horizontal position and valve 11 will close by gravity and the pressure of water in compartment 10. The float will then continue to rise with the rising of the water in compartment 9 carrying with it the lever 30 which moves slowly upward owing to the engagement of said lever 30 with stem 25 and gradually brings latch 31 into engagement with catch 5 and when so engaged the trough will be locked against tilting. The water continues to flow in through valve 18, as the weight of the long arm of lever 21 is sufficient to hold said valve open against the pressure of inflowing water, until stop 28 engages lever 21 and raises it sufficiently to close said valve 18 connected with the other end thereof.

From the above description it will be seen that the operation of this trough is automatic throughout, filling, emptying and cleansing itself without requiring the services of an attendant, but should it be desired to empty the tank manually at any time the fastening bolt of foot 4' is loosened and the standard 4 moved away from the end of the trough to disengage its finger 5 from the nose or finger 31 of lever 30 and thus permit the trough to be tilted.

I claim as my invention:

1. In a watering trough the combination of a tank pivotally mounted intermediately of its ends, a partition arranged transversely in said tank and having an opening at the bottom thereof and dividing said tank into compartments, a valved outlet for one of said compartments the other compartment having an inlet, and means for opening said valved outlet on the tilting of the tank at a predetermined angle, said inlet and partition opening being so proportioned relatively to each other as to cause the water to accumulate first in the inlet containing compartment.

2. A watering trough comprising a tilting tank provided with compartments communicating at their lower ends, a valved outlet for one of said compartments, float controlled means for supplying water to the other compartment, means for locking said tank against tilting when the water is at a predetermined height therein, and means for releasing said locking means on the lowering of the water below a predetermined level.

3. A watering trough comprising a tilting tank provided with compartments communicating at their lower ends, a valved outlet for one of said compartments, float controlled means for supplying water to the other compartment, means for locking said tank against tilting when the water is at a predetermined height therein, means for releasing said locking means on the lowering of the water below a predetermined level, and means for opening the valved outlet on the release of said locking means.

4. A tilting watering trough pivoted intermediately of its ends at a point nearer one end than the other, a transverse partition arranged in said tank and having an opening at its lower end providing communication between said compartments, said partition being arranged midway the length of said tank, one of said compartments having a discharge opening in the bottom thereof, a valve closing said opening and having a depending stem extending below the bottom of the compartment, means for engaging said stem on the tilting of said tank for opening said valve, a float mounted in the other compartment having an upwardly extending stem, levers slidably engaged with said stem, one of said levers being fulcrumed on said tank and having a latch, a coöperating catch member for engaging said latch to hold said tank against tilting until the water sinks below a predetermined level in the tank, and a valved supply pipe, the valve of which is connected with the other lever.

5. A watering trough comprising a rectangular tank pivotally mounted intermediately of its ends at a point nearer one end than the other, a transverse partition arranged in said tank midway the ends thereof and having an opening in its lower end forming a supply and a discharge compartment, a valved outlet for said discharge compartment, means for opening the valve of said outlet on the tilting of the tank, a standard arranged adjacent one end of said tank and having a finger extending laterally over the inlet compartment of the tank, a float disposed in said inlet compartment and having an upwardly extending stem with stops thereon, a lever fulcrumed on one wall of said inlet compartment and having one end slidably engaged with said float stem and the other end provided with a latch finger for engagement with the finger on said standard when the tank is in normal position, a valved supply pipe opening over said inlet compartment and a lever connected with the valve of said supply pipe and controlled by the rise and fall of the float.

6. A watering trough comprising a rectangular tank pivotally mounted intermediately of its ends at a point nearer one end than the other, a transverse partition arranged in said tank midway the ends thereof and having an opening in its lower end forming a supply and a discharge compartment, a valved outlet for said discharge compartment, means for opening the valve of said outlet on the tilting of the tank, a standard arranged adjacent one end of said tank and having a finger extending laterally over the inlet compartment of the tank, a float disposed in said inlet compartment and having an upwardly extending stem with stops thereon, a lever fulcrumed on one wall of said inlet compartment and having one end slidably engaged with said float stem and the other end provided with a latch finger for engagement with the finger on said standard when the tank is in normal position, a valved supply pipe opening over said inlet compartment, a lever connected with the valve of said supply pipe and controlled by the rise and fall of the float, said lever being in the form of the bell crank having its short arm depending and transversely slotted, the stem of the inlet valve being slidably engaged in the slot of said arm, the other arm of said lever being loosely connected with the stem of the float.

7. A tilting watering trough pivoted intermediately of its ends at a point nearer one end than the other, a transverse partition arranged in said tank and having an opening at its lower end providing communication between said compartments, said partition being arranged midway the length of said tank, one of said compartments having a discharge opening in the bottom thereof, a valve closing said opening and having a depending stem extending below the bottom of the compartment, means for engaging said stem on the tilting of said tank for opening said valve, a float mounted in the other compartment having an upwardly extending stem, levers slidably engaged with said stem, one of said levers being fulcrumed on said tank and having a latch, a coöperating catch member for engaging said latch to hold said tank against tilting until the water sinks below a predetermined level in the tank, stops adjustably mounted on said float stem for controlling the operation of said levers, and a valved supply pipe, the valve of which is connected with the other lever.

In testimony whereof I have hereunto set my hand in presence of two subscribing witnesses.

JOHN B. CONRAD.

Witnesses:
H. W. FUNKE,
J. W. INMAN.